Sept. 3, 1940. J. J. HOPFIELD 2,213,395
MANUFACTURE OF MULTIPLE GLASS SHEET GLAZING UNITS
Filed July 14, 1937 2 Sheets-Sheet 1
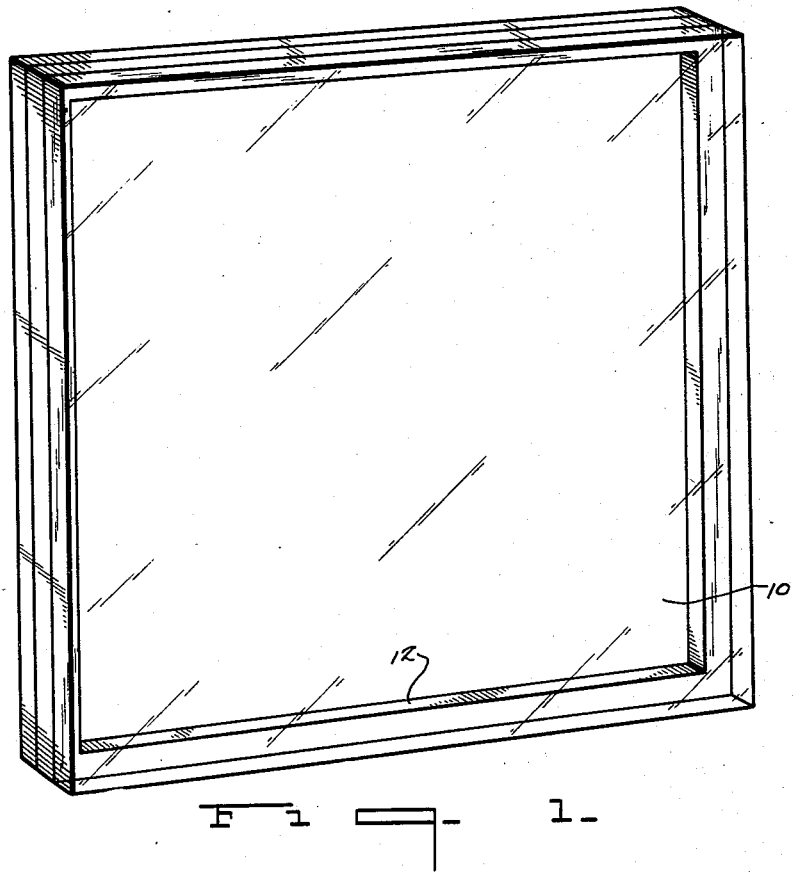
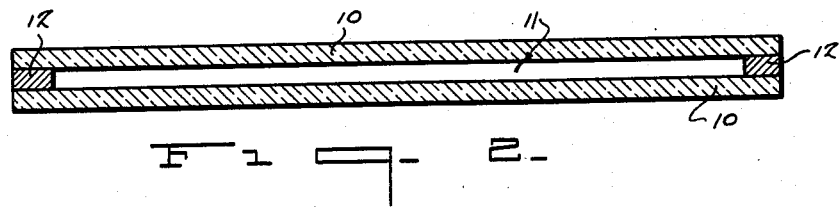
Inventor
JOHN J. HOPFIELD.
By Frank Fraser
Attorney Sept. 3, 1940.   J. J. HOPFIELD   2,213,395
MANUFACTURE OF MULTIPLE GLASS SHEET GLAZING UNITS
Filed July 14, 1937   2 Sheets-Sheet 2
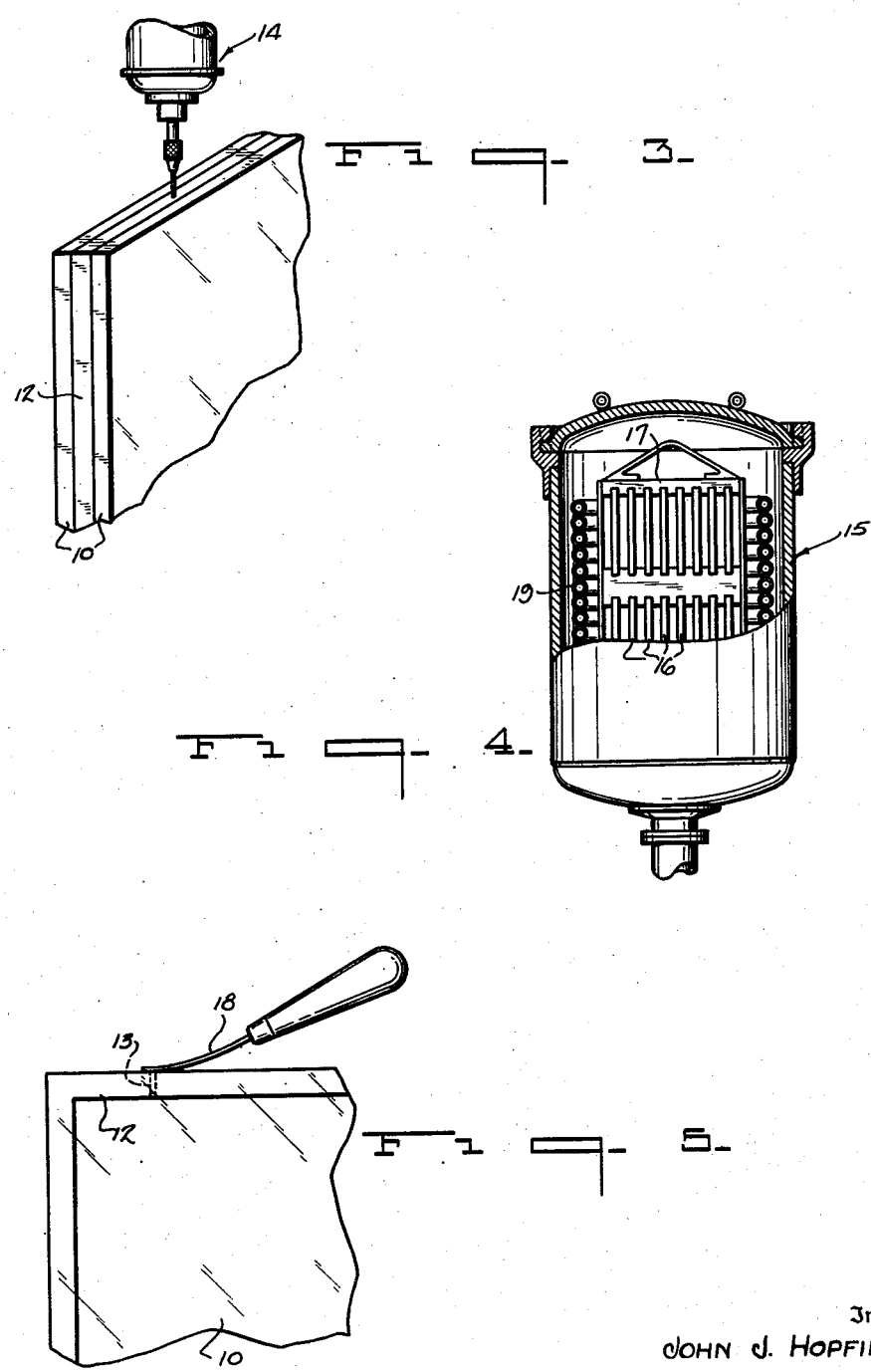
Inventor
JOHN J. HOPFIELD.
By Frank Fraser
Attorney Patented Sept. 3, 1940

2,213,395

UNITED STATES PATENT OFFICE 2,213,395

MANUFACTURE OF MULTIPLE GLASS SHEET GLAZING UNITS

John J. Hopfield, Toledo, Ohio, assignor to Libbey-Owens-Ford Glass Company, Toledo, Ohio, a corporation of Ohio Application July 14, 1937, Serial No. 153,459

9 Claims. (Cl. 154—28)

The present invention relates to the manufacture of multiple glass sheet glazing units and particularly that type of unit comprising two or more sheets of glass having separator means arranged between and bonded to the said sheets entirely around the edges thereof whereby to provide a dead air space between the glass sheets which is usually filled with dehydrated air, nitrogen, or some other suitable gas.

Briefly, in dehydrating a multiple glass sheet glazing unit of the above character, the separator means is provided with one or more openings communicating with the air space between the glass sheets. Dehydrated air, nitrogen, or other suitable gas is then passed through the space between the sheets to effect the removal of all moisture and other volatile matter therefrom and after this has been done, the openings are closed in any suitable manner. By using dehydrated air or the like and in driving off all moisture and other volatile matter from between the glass sheets, condensation of moisture upon the inner faces of the said sheets, as well as staining, fading, and efflorescing of the glass, will be greatly minimized if not entirely eliminated. The practice, heretofore ordinarily followed in dehydrating multiple glazing units, has been rather cumbersome and costly, necessitating the treatment of each unit individually as a result of which predetermined, uniform conditions could not be obtained from unit to unit.

The primary object of the invention is the provision of an improved process for dehydrating multiple glass sheet glazing units of the above character in such a manner as to effect the setting up of predetermined, uniform conditions therein.

Another object of the invention is the provision of such a process wherein a plurality of glazing units can be treated simultaneously and further, wherein the dehydrated air or other gas used can be sealed up in the units at a predetermined pressure to suit varying climatic conditions prevailing in different sections of the country or for use in refrigeration.

Other objects and advantages of the invention will become more apparent during the course of the following description, when taken in connection with the accompanying drawings.

In the drawings, wherein like numerals are employed to designate like parts throughout the same, Fig. 1 is a perspective view of one type of glazing unit which can be dehydrated according to the invention, Fig. 2 is a vertical transverse sectional view therethrough, Fig. 3 is a view illustrating the formation of the opening in the separator means, Fig. 4 is an elevation, partially in section, of one form of vacuum chamber which can be used in carrying out the invention, and Fig. 5 is a view showing the sealing of the opening in the separator means after the dehydrating treatment.

In Figs 1 and 2 is shown a finished multiple glass glazing unit comprising two sheets of glass 10 arranged face to face but slightly spaced from one another to provide a dead air space 11 therebetween. Arranged between the glass sheets entirely around the marginal portions thereof, are the separator means comprising strips 12 bonded to the glass sheets to form a unitary structure. The separator strips, when firmly bonded to the glass sheets, serve not only to hermetically seal the space 11 therebetween, but further serve to maintain the glass sheets in predetermined spaced relation.

The glazing unit herein shown and described is disclosed simply by way of example to illustrate the present invention, and it is to be expressly understood that the invention is not restricted to the dehydrating of a unit of any particular construction. For instance, three or more sheets of glass can be used in making the unit, while the separator strips may be of an organic material or of metal and bonded to the glass sheets in any desired manner with or without the application of heat and pressure. However, in all types of multiple glazing units including two or more sheets of glass having a hermetically sealed space therebetween, it is preferred that the space be filled with dehydrated air or some other gas which is ordinarily at substantially normal atmospheric pressure, although the pressure of the dehydrated air or gas may be varied one way or the other for special installations and to meet particular conditions.

In dehydrating the unit, the separator strips 12 are first provided with one or more openings 13 (Fig. 5) and which opening or openings communicate with the said air space 11. The openings can be formed in the separator strips either before they are associated with the glass sheets or after the unit has been assembled such as by means of an ordinary drill 14 shown in Fig. 3 or by using a hypodermic needle or the like.

According to the invention, a plurality of glazing units are adapted to be treated simultaneously and, therefore, after the openings 11 have been formed in the separator strips of a number of units, the said units are placed in a suitable vacuum chamber or autoclave 15 (Fig. 4), the units being designated therein by the numeral 16 and being carried in a rack 17. When the units have been placed in the chamber, the said chamber is closed and a vacuum set up therein which serves to completely evacuate or withdraw the air simultaneously from the air spaces 11 of all of the units. After the units have been completely exhausted, the vacuum is broken by allowing conditioned or dehydrated air, nitrogen, or other gas into the vacuum chamber, and this conditioned or dehydrated air, nitrogen, or other gas will be forced through the openings 13 into the air spaces 11 between the glass sheets.

The evacuating of the units and the subsequent filling thereof with prepared dry air or other gas can be accomplished rapidly and conveniently and without placing any strain upon the units. The chamber 15 is then adapted to be opened and the subsequent filling thereof with prepared dry air or other gas can be accomplished rapidly and conveniently and without placing any strain upon the units. The chamber 15 is then adapted to be opened and the opening or openings 13 in each unit suitable closed. This may be done, for example, by means of a hot iron 18 shown in Fig. 3, if an organic material such as rubber or rubber composition is used for the separator strip; whereas, if the separator strip is of metal, the opening can be plugged with solder or some other material.

It will be readily appreciated that by simultaneously dehydrating a plurality of units, predetermined, uniform conditions can be set up within the air spaces of the several units. This is vastly superior to the dehydrating methods heretofore employed wherein the units were handled one at a time, as a result of which difficulty was experienced in the setting up of predetermined, uniform conditions from unit to unit. Moreover, by the use of suitable controls, the vacuum created within the chamber 15, as well as the temperature and pressure of the conditioned air or gas introduced into the said chamber, can be accurately regulated. Thus, it may be found desirable to heat the units in vacuum for better conditioning of the inner surfaces of the glass sheets and it is therefore preferred that the chamber 15 be provided with a suitable heating device which, as shown in Fig. 4, may consist of steam or hot water coils 19, although, of course, any desired type of heating means may be employed. The units can be heated not only during the exhausting of the air therefrom, but also during the introduction of the conditioned air or gas as desired.

While it is preferred to fill the space between the glass sheets with dehydrated air or gas at normal atmospheric pressure, the pressure may be varied to suit different climatic conditions. Therefore, it is also preferred that cooling devices be associated with the chamber 15 and for this purpose, the steam or hot water coils 19 may be changed to cooling coils or some other cooling device may be associated with the chamber. Thus, when the units are sealed up at atmospheric pressure and then allowed to cool to room temperature, any pressure from slightly greater than atmospheric to slightly less than atmospheric can be sealed in the units. By varying the amount of pressure within the units, the said units can be made to suit the prevailing pressure or temperature conditions to which they will be subjected in actual use such as, for example, in the higher altitudes of certain sections of the country or for use in refrigeration. While the dehydrated air or gas is preferably sealed in the unit at room pressure, the temperature of the dehydrated air or gas can be controlled so as to give a predetermined pressure in the finished unit. Consequently, the temperature of the sealed in air or gas can be either higher or lower than room temperature according as to whether it is desired to have a pressure in the finished product less or greater than the pressure of the air in the room. A special case of the above is to pump out the air from the units in the chamber 15 and then sealing the vent openings 13 in vacuum, thus leaving no air or other gas in the finished unit. Of course, in such case, the unit will need to be especially reinforced to prevent its collapse in use.

The term "dehydrated air" occurring in the claims is to be considered in a generic sense to cover not only air but also nitrogen or any other suitable gas which may be satisfactorily employed in place of air and which may be dried and conditioned in any preferred manner.

I claim:

1. In the fabrication of a multiple glass sheet glazing unit including a plurality of sheets of glass and separator means arranged between the glass sheets around the edges thereof and bonded thereto to provide an air space therebetween, the process consisting in first providing an opening in the separator means communicating with said air space, placing said unit in a chamber, creating a vacuum within said chamber to exhaust the air from within the unit, heating the said unit in vacuum, and in finally closing said opening.

2. In the fabrication of a multiple glass sheet glazing unit including a plurality of sheets of glass and separator means arranged between the glass sheets around the edges thereof and bonded thereto to provide an air space therebetween, the process consisting in first providing an opening in the separator means communicating with said air space, placing said unit in a chamber, creating a vacuum within said chamber to exhaust the air from within the unit, heating the said unit in vacuum, then introducing dehydrated air into said chamber where it is caused to pass through said opening to fill said air space, and in finally closing the said opening.

3. In the fabrication of a multiple glass sheet glazing unit including a plurality of sheets of glass and separator means arranged between the glass sheets around the edges thereof and bonded thereto to provide an air space therebetween, the process consisting in first providing an opening in the separator means communicating with said air space, placing said unit in a chamber, creating a vacuum within said chamber to exhaust the air from within the unit, then introducing dehydrated air into said chamber where it is caused to pass through said opening to fill said air space in cooling the unit during the introduction of the dehydrated air, and in finally closing the said opening.

4. In the fabrication of a multiple glass sheet glazing unit including a plurality of sheets of glass and separator means arranged between the glass sheets around the edges thereof and bonded thereto to provide an air space therebetween, the process consisting in first providing an opening in the separator means communicating with said air space, placing said unit in a chamber, creating a vacuum within said chamber to exhaust the air from within the unit, then introducing dehydrated air into said chamber where it is caused to pass through said opening to fill said air space, in heating the unit during the introduction of the dehydrated air, and in finally closing the said opening.

5. In the fabrication of a multiple glass sheet glazing unit including a plurality of sheets of glass and separator means arranged between the glass sheets around the edges thereof and bonded thereto to provide an air space therebetween, the process consisting in first providing an opening in the separator means of a plurality of units and which openings communicate with the air spaces of said units, placing the units in a chamber, creating a vacuum within said chamber to exhaust the air simultaneously from said units through said openings, heating the said units in vacuum, and in finally closing said openings.

6. In the fabrication of a multiple glass sheet glazing unit including a plurality of sheets of glass and separator means arranged between the glass sheets around the edges thereof and bonded thereto to provide an air space therebetween, the process consisting in first providing an opening in the separator means of a plurality of units and which openings communicate with the air spaces of said units, placing the units in a chamber, creating a vacuum within said chamber to exhaust the air simultaneously from said units through said openings, heating the said units in vacuum, then introducing dehydrated air into said chamber where it is caused to pass through the said openings to simultaneously fill said air spaces, and in finally closing the said openings.

7. In the fabrication of a multiple glass sheet glazing unit including a plurality of sheets of glass and separator means arranged between the glass sheets around the edges thereof and bonded thereto to provide an air space therebetween, the process consisting in first providing an opening in the separator means of a plurality of units and which openings communicate with the air spaces of said units, placing the units in a chamber, creating a vacuum within said chamber to exhaust the air simultaneously from said units through said openings, then introducing dehydrated air into said chamber where it is caused to pass through the said openings to simultaneously fill said air spaces, in cooling the units during the introduction of the dehydrated air, and in finally closing said openings.

8. In the fabrication of a multiple glass sheet glazing unit including a plurality of sheets of glass and separator means arranged between the glass sheets around the edges thereof and bonded thereto to provide an air space therebetween, the process consisting in first providing an opening in the separator means of a plurality of units and which openings communicate with the air spaces of said units, placing the units in a chamber, creating a vacuum within said chamber to exhaust the air simultaneously from said units through said openings, then introducing dehydrated air into said chamber where it is caused to pass through the said openings to simultaneously fill said air spaces, in heating the units during the introduction of the dehydrated air, and in finally closing the said openings.

9. In the fabrication of a multiple glass sheet glazing unit including a plurality of sheets of glass and separator means arranged between the glass sheets around the edges thereof and bonded thereto to provide an air space therebetween, the process consisting in first providing an opening in the separator means communicating with said air space, placing said unit in a chamber, creating a vacuum within said chamber to exhaust the air from within the unit, introducing dehydrated air into said chamber at atmospheric pressure where it is caused to pass through said opening to fill said air space, regulating and maintaining the temperature of the said chamber to produce a predetermined pressure within the unit, in then closing the opening in the separator means, and finally bringing the unit to room temperature to obtain the desired predetermined pressure therein.

JOHN J. HOPFIELD.